(12) United States Patent
Fukawatase et al.

(10) Patent No.: US 7,753,403 B2
(45) Date of Patent: Jul. 13, 2010

(54) KNEE AIRBAG DEVICE, AND METHOD OF FITTING STEERING COLUMN PROVIDED WITH KNEE AIRBAG DEVICE TO VEHICLE

(75) Inventors: Osamu Fukawatase, Nishikamo-gun (JP); Kenji Imamura, Kosai (JP); Akiyoshi Sanada, Nishikamo-gun (JP); Yuichi Adachi, Nishikasugai-gun (JP); Kazuaki Bito, Nishikasugai-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 134 days.

(21) Appl. No.: 12/073,249

(22) Filed: Mar. 3, 2008

(65) Prior Publication Data

US 2008/0217888 A1    Sep. 11, 2008

(30) Foreign Application Priority Data

Mar. 9, 2007   (JP)   ............................. 2007-060200

(51) Int. Cl.
  B60R 21/16   (2006.01)
  B60R 21/20   (2006.01)
  B60R 21/26   (2006.01)
(52) U.S. Cl. ..................... 280/730.1; 280/750; 280/751
(58) Field of Classification Search .............. 280/728.2, 280/731, 750, 751
  See application file for complete search history.

(56) References Cited

U.S. PATENT DOCUMENTS

| 5,570,901 A | 11/1996 | Fyrainer | |
| 6,942,245 B2* | 9/2005 | Takimoto et al. | 280/730.1 |
| 7,182,365 B2* | 2/2007 | Takimoto et al. | 280/730.1 |
| 7,226,075 B2* | 6/2007 | Nagata et al. | 280/731 |
| 7,370,881 B2* | 5/2008 | Takimoto et al. | 280/730.1 |
| 2007/0182134 A1* | 8/2007 | Mizuno et al. | 280/730.1 |
| 2008/0116669 A1* | 5/2008 | Adachi et al. | 280/730.1 |

FOREIGN PATENT DOCUMENTS

| DE | 199 48 021 A1 | 4/2001 |
| EP | 0 814 977 B1 | 11/2000 |
| JP | U-3019069 | 12/1995 |

(Continued)

OTHER PUBLICATIONS

Office Action issued in German Patent Application No. 10 2008 000 512.6-56; dated Mar. 22, 2010; with English-language translation.

*Primary Examiner*—Toan C To
(74) *Attorney, Agent, or Firm*—Oliff & Berridge, PLC

(57) ABSTRACT

In a steering column provided with a knee airbag device to a vehicle, an airbag module, which is integrally provided on an airbag door formed separately from a column lower cover, is fitted to a column tube after a steering column body is assembled, and before a steering lock is fitted to the column tube. Then, after the airbag module is fitted to the column tube, a steering column sub-assembly, which is formed by fitting at least the steering lock to the column tube, is fitted to an instrument panel provided in a vehicle at a predetermined position. After the steering column sub-assembly is fitted to the instrument panel, the column lower cover and a column upper cover, which cover a rear end portion of the steering column, are fitted to the steering column.

9 Claims, 9 Drawing Sheets

FOREIGN PATENT DOCUMENTS

| | | |
|---|---|---|
| JP | A-08-301054 | 11/1996 |
| JP | A-09-104317 | 4/1997 |
| JP | A-10-071911 | 3/1998 |
| JP | A-2001-106013 | 4/2001 |
| JP | A-2001-146144 | 5/2001 |
| JP | A-2002-037003 | 2/2002 |
| JP | A-2004-026039 | 1/2004 |
| JP | A-2004-098864 | 4/2004 |
| JP | A-2005-186888 | 7/2005 |

* cited by examiner

KNEE AIRBAG DEVICE, AND METHOD OF FITTING STEERING COLUMN PROVIDED WITH KNEE AIRBAG DEVICE TO VEHICLE

INCORPORATION BY REFERENCE

The disclosure of Japanese Patent Application No. 2007-060200 filed on Mar. 9, 2007 including the specification, drawings and abstract is incorporated herein by reference in its entirety.

BACKGROUND OF THE INVENTION

1. Field of the Invention

The invention relates to a knee airbag device that includes a knee airbag that is inflated and deployed to restrain knees of an occupant at the time of collision, and a method of fitting a steering column provided with the knee airbag device to a vehicle.

2. Description of the Related Art

Various knee airbag devices have been proposed to protect knees of an occupant. For example, Japanese Patent Application Publication No. 9-104317 (JP-A-9-104317) describes a knee airbag device in which a knee airbag module is disposed inside a column cover that covers a steering column.

However, in the above-described technology, if the airbag module is integrated with a column lower cover, it is necessary to perform the operation of connecting a wire harness to a combination switch and the like, before the column lower cover is fitted to the steering column. Therefore, the column lower cover is fitted to the steering column in a final process. When the column lower cover (airbag module) is fitted to the steering column, bolts are fitted to nuts, or the nuts are fitted to the bolts in a fitting direction from above the steering column to below the steering column. At this time, components such as the steering lock have been already fitted to the steering column. Therefore, it is extremely difficult to perform the operation of fitting the bolts and nuts to each other.

SUMMARY OF THE INVENTION

The invention provides a knee airbag device that makes it possible to easily fit an airbag module to a steering column, and a method of fitting a steering column provided with the knee airbag device to a vehicle.

According to a first aspect of the invention, a knee airbag device includes: an opening formed in a column lower cover that covers a rear lower end portion of a steering column; an airbag door that is formed separately from the column lower cover, and that covers the opening, wherein when an airbag inflation pressure equal to or above a predetermined value is applied to the airbag door, the airbag door is opened; and an airbag module that is integrally provided on a surface of the airbag door, which faces the steering column, wherein the airbag module includes a gas generation device that generates gas when a vehicle collides with a collision object or when it is predicted that the vehicle will collide with the collision object, and a knee airbag that is stored in a folded state, and that is inflated and deployed through the opening when the knee airbag receives the gas from the gas generation device.

According to the first aspect of the invention, when the vehicle has a collision with a collision object, the gas generation device is operated to generate gas. The generated gas flows into the knee airbag stored in the folded state, and thus, the knee airbag is inflated. When the airbag inflation pressure, which is applied to the airbag door, is equal to or above the predetermined value, the airbag door is opened, and the opening formed in the column lower cover is uncovered. Thus, the knee airbag is inflated and deployed toward the knees of the occupant through the opening, and thus, the knee airbag restrains and protects the knees of the occupant.

In the first aspect, the opening is formed in the column lower cover, and the airbag door is formed separately from the column lower cover. The airbag module, which includes the gas generation device and the knee airbag, is integrally provided on the surface of the airbag door, which faces the steering column. Therefore, in the stage before the airbag module is fitted to the steering column, the column lower cover is separate from, and independent of the airbag door on which the airbag module is integrally provided. Therefore, in the initial stage of the process of assembling the steering column (the column sub-line process), the airbag module can be fitted to the steering column. That is, because the airbag module is disposed below the steering column, when the airbag module is fitted to the steering column, bolts are fitted to nuts, or nuts are fitted to bolts in a fitting direction from above the steering column to below the steering column. If other components (for example, a steering lock) have been already fitted to the steering column, that is, there are the other components in this fitting direction, it is extremely difficult to perform the operation of fitting the airbag module to the steering column. However, in the invention, the airbag module is fitted to the steering column before the other components, which may interfere with the operation of fitting the airbag module to the steering column, are fitted to the steering column. Thus, it is extremely easy to fit the airbag module to the steering column.

As described above, the knee airbag device according to the first aspect of the invention makes it possible to easily fit the airbag module to the steering column.

According to a second aspect of the invention, in the knee airbag device according to the first aspect, the airbag door and the airbag module are connected to each other by a flexible connection member, the connection member and the airbag module are fixed to a column tube of the steering column; at least a portion of the connection member functions as a hinge when the airbag door is opened; and the connection member includes an extra length portion that maintains the airbag door at a position away from the opening when the airbag door is opened.

According to the second aspect, when the airbag inflation pressure is equal to or above the predetermined value, the airbag door is opened, and the opening formed in the column lower cover is uncovered. The connection member and the airbag module are fixed to the column tube of the steering column, and at least a portion of the connection member functions as a hinge. Therefore, the airbag door is opened using the connection member.

The steering column may include a mechanism that contracts the column tube of the steering column to absorb the energy at the time of secondary collision. In this case, when a secondary impact load is input from the occupant toward the front portion of the column tube of the steering column in the axial direction of the steering column at the time of frontal collision, the connection member is pulled into the column lower cover. However, because the extra length portion is provided in the connection member, the airbag door itself is not pulled into the column lower cover from the opening.

Further, a component (rigid object) fitted to the column tube may interfere with the connection member that connects the airbag door and the airbag module. However, because the connection member is flexible, if the component interferes with the connection member when the steering column is contracted, the connection member is flexibly deformed.

Due to the above-described reasons, the connection member does not interfere with the contraction movement of the column tube.

As described above, the knee airbag device according to the second embodiment makes it possible to smoothly contract the steering column when the occupant has a secondary collision (that is, the knee airbag device according to the second aspect makes it possible for the steering column to effectively absorb the energy).

According to a third aspect of the invention, in the knee airbag device according to the second aspect, a pair of attachment wall portions may stand on a surface of the column lower cover, which faces the steering column, in a manner such that the opening is positioned between the attachment wall portions. An upper surface of the airbag module may be covered by the connection member and the connection member may be fixed to the attachment wall portions so that a predetermined tension is applied to the connection member.

According to the third aspect, the attachment wall portions stand on the surface of the column lower cover, which faces the steering column, in a manner such that the opening is positioned between the attachment wall portions. The upper surface of the airbag module is covered by the connection member and the connection member is fixed to the attachment wall portions so that a predetermined tension is applied to the connection member. That is, when the knee airbag device is provided in the vehicle, a pressing force toward the opening (i.e., in the direction where the knee airbag is deployed) is applied to the knee airbag in the folded state. Accordingly, when the gas generation device is operated and the knee airbag is inflated and deployed, it is possible to reduce the possibility that a portion of the knee airbag is inflated toward the column tube to have a round shape.

The knee airbag device according to the third aspect makes it possible to regulate the direction where the knee airbag is deployed, to a desired direction.

According to a fourth aspect of the invention, in the knee airbag device according to the above-described aspect, a portion of the knee airbag is rolled up, and another portion of the knee airbag is accordion-folded; and the portion that is accordion-folded is disposed to face the steering column, and the portion that is rolled up is disposed close to the airbag door.

According to the fourth aspect, a portion of the knee airbag is rolled up, and another portion of the knee airbag is accordion-folded. The accordion-folded portion is disposed to face the steering column, and the rolled-up portion is disposed close to the airbag door. Therefore, first, the gas injected from the gas generation device flows into the accordion-folded portion, and the accordion-folded portion is inflated. As a result, the rolled-up portion disposed close to the airbag door is pushed in the direction in which the airbag door is deployed. Thus, it is possible to increase the airbag inflation pressure that is applied to the airbag door from the initial stage of the inflation of the knee airbag.

The knee airbag device according to the fourth aspect makes it possible to regulate the direction where the knee airbag is deployed, to the desired direction, and to deploy the knee airbag more quickly, by employing the above-described folding method.

According to a fifth aspect of the invention, a method of fitting a steering column provided with a knee airbag device to a vehicle, includes: assembling a steering column body that includes a steering shaft in which a steering wheel is fixed at a rear end portion, and a column tube that covers the steering shaft in a manner such that the steering shaft is rotated; fitting an airbag module, which is integrally provided on an airbag door formed separately from a column lower cover, to the column tube after the steering column body is assembled, and before a steering lock is fitted to the column tube; fitting a steering column sub-assembly, which is formed by fitting at least the steering lock to the column tube, to an instrument panel provided in a vehicle at a predetermined position after the airbag module is fitted to the column tube; and fitting the column lower cover and a column upper cover, which cover a rear end portion of the steering column, to the steering column after the steering column sub-assembly is fitted to the instrument panel.

According to the fifth aspect, first, the steering column body, which includes the steering shaft and the column tube, is assembled. Then, the airbag module, which is integrally provided on the airbag door formed separately from the column lower cover, is fitted to the column tube. This operation is performed after the steering column body is assembled, and before the steering lock is fitted to the column tube. Accordingly, nothing interferes with the operation of fitting the airbag module to the column tube. Thus, the operation of fitting the airbag module to the column tube is performed extremely easily.

Next, at least the steering lock is fitted to the column tube, and thus, the steering column sub-assembly is formed. The fitting operations so far are performed in a steering column sub-line. Then, the steering column sub-assembly is fitted to the instrument panel provided in the vehicle at the predetermined position. The process of assembling the instrument panel is performed in an instrument panel sub-line that is separate from the steering column sub-line.

Then, the column lower cover and the column upper cover, which cover the rear end portion of the steering column, is fitted to the steering column.

Thus, according to the fifth aspect, the airbag door is formed separately from the column lower cover, and the airbag module is integrally provided on the airbag door. Therefore, it is not necessary to follow the procedure in which the airbag module is fitted to the column tube after the steering column is fitted to the instrument panel provided in the vehicle. Thus, the airbag module can be fitted to the column tube in the line process of the steering column sub-line (more specifically, before the steering lock is fitted to the column tube). Accordingly, as described above, nothing interferes with the operation of fitting the airbag module to the column tube. Thus, it is possible to perform the operation of fitting the airbag module to the column tube extremely easily.

In the method of fitting the steering column provided with the knee airbag device to a vehicle according to the fifth aspect, it is possible to perform the operation of fitting the airbag module to the column tube extremely easily. This greatly improves the operating efficiency, and accordingly, the efficiency of producing the vehicle.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF EMBODIMENTS

First Embodiment

Figure 1:
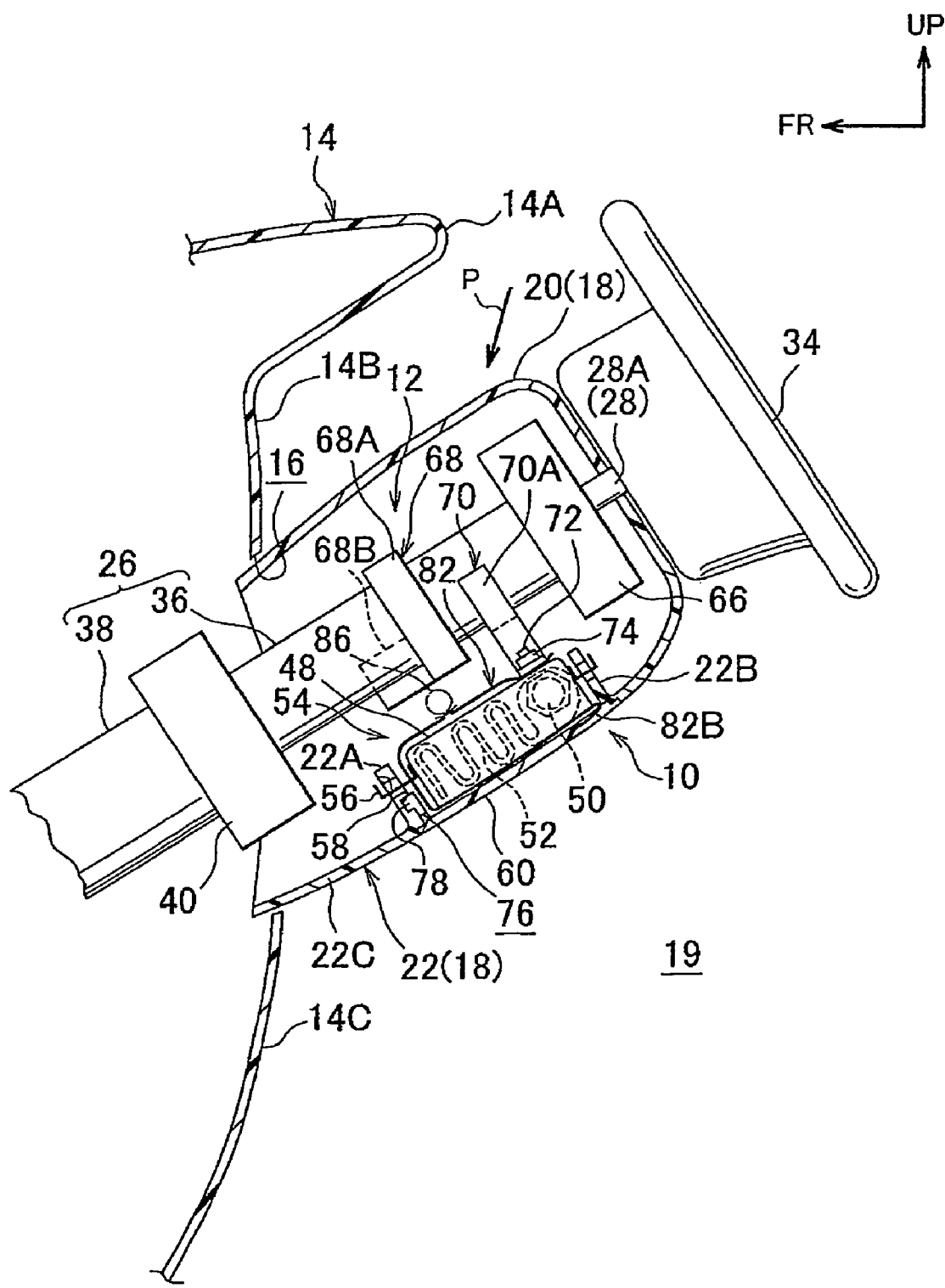
FIG. 1 is a longitudinal sectional view showing the entire configuration of a knee airbag device according to a first embodiment in a lateral view.
Figure 2:
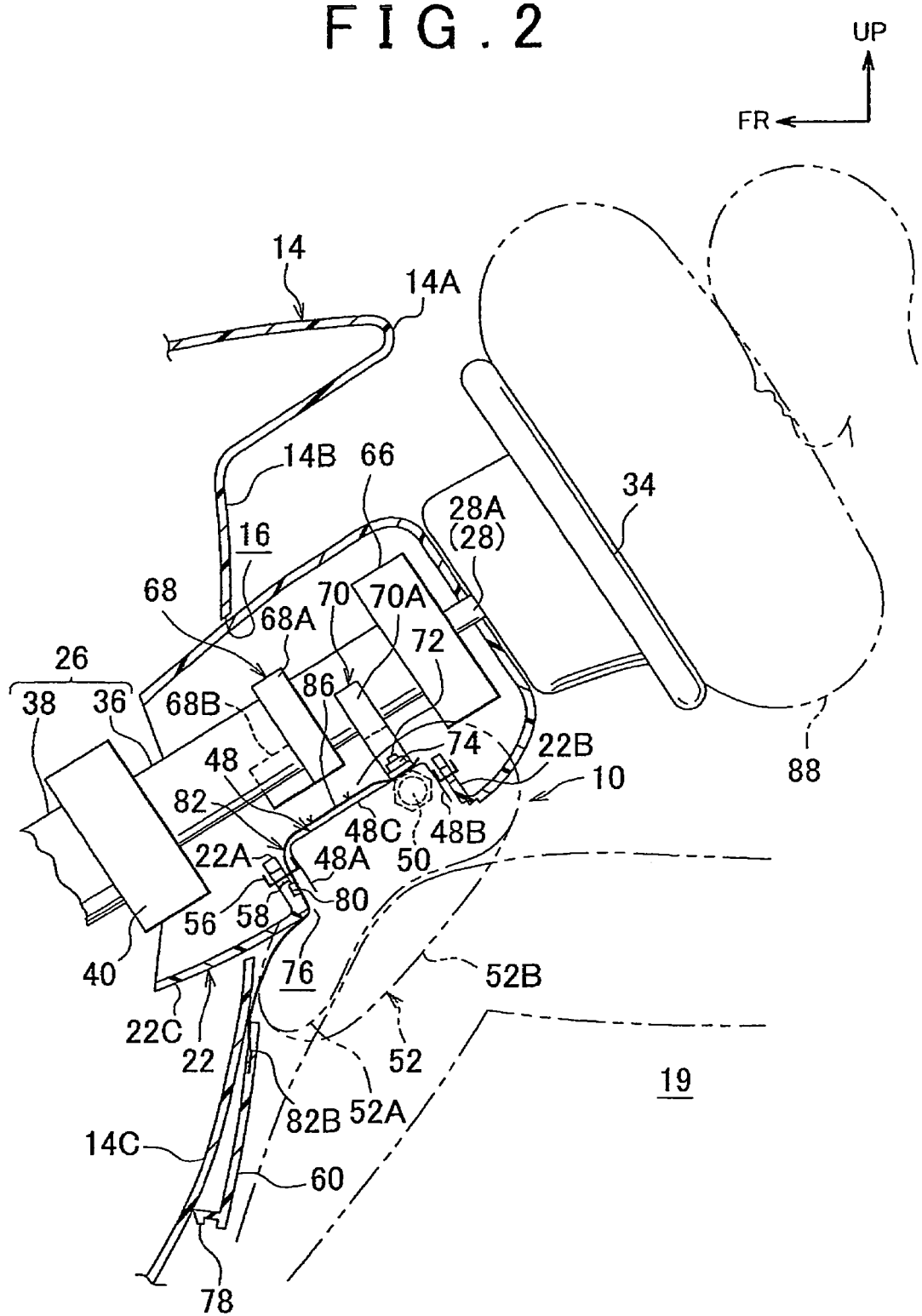
FIG. 2 is a longitudinal sectional view showing the knee airbag device shown in FIG. 1 that is operated, FIG. 2 corresponding to FIG. 1.
Figure 3:
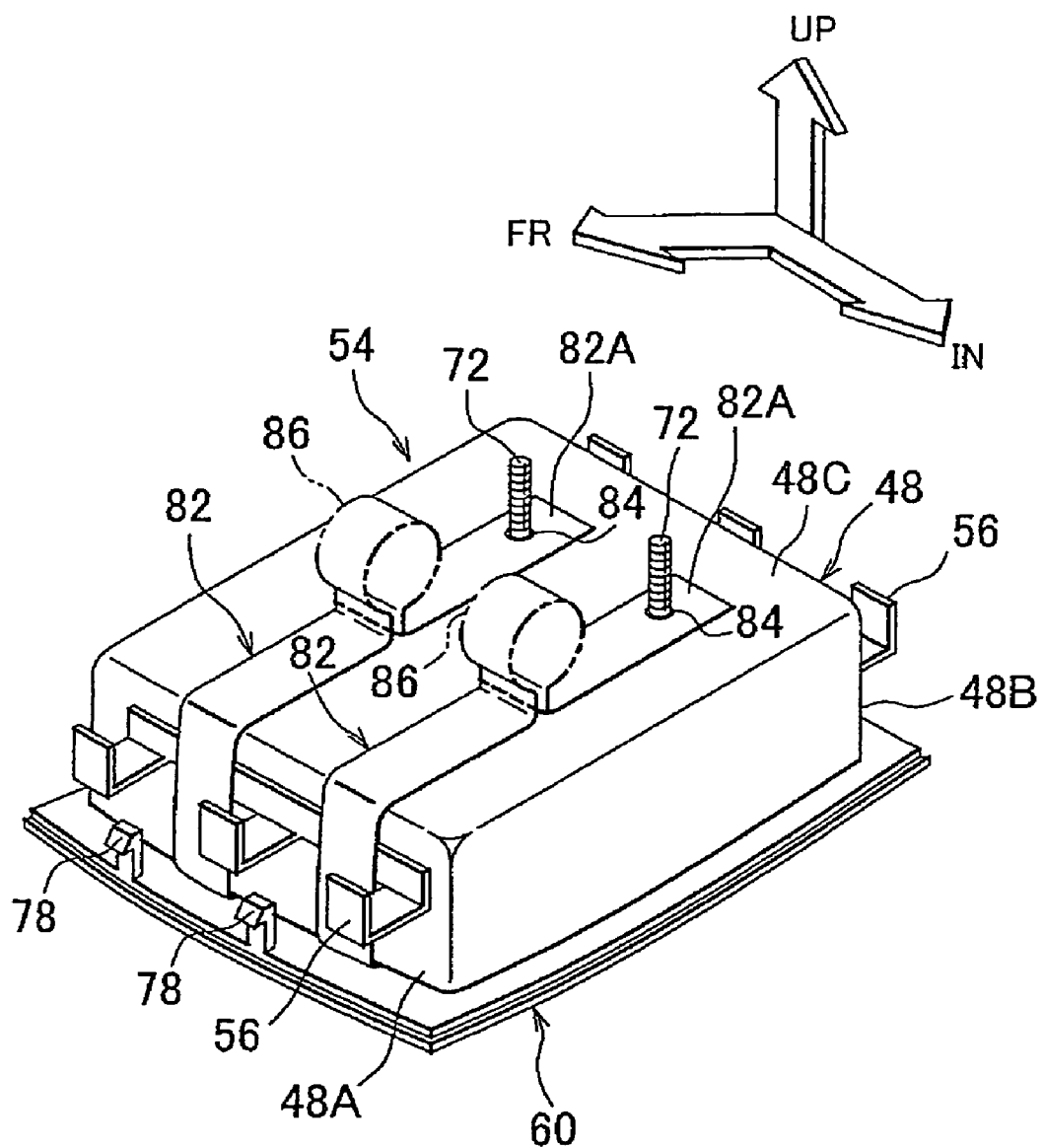
FIG. 3 is an enlarged perspective view showing an airbag door and an airbag module shown in FIG. 1.

Hereinafter, a knee airbag device according to a first embodiment of the invention will be described with reference to FIG. 1 to FIG. 3. In FIG. 1 to FIG. 3, the arrow FR indicates the front of a vehicle. The arrow UP indicates the top of the vehicle. The arrow IN indicates the inside of a vehicle in a vehicle-width direction.

FIG. 1 is a longitudinal sectional view showing the entire configuration of a knee airbag device 10 according to the embodiment. FIG. 2 is a longitudinal sectional view showing the knee airbag device 10 that is operated. FIG. 3 is an enlarged perspective view of an airbag door and an airbag module that are fitted to a steering column, seen from above.

As shown in FIG. 1 to FIG. 3, an opening portion 16 is formed in a portion of an instrument panel 14, which faces a driver seat. A steering column 12 is inserted through the opening portion 16 such that the steering column 12 is inclined downward toward the front of the vehicle. A column cover 18 covers the rear end portion of the steering column 12, which protrudes toward a vehicle cabin 19 from the opening portion 16 of the instrument panel 14. The column cover 18 is divided into two portions, i.e., an upper portion and a lower portion. More specifically, the column cover 18 includes a column upper cover 20 and a column lower cover 22. The instrument panel 14 is also divided into two portions, i.e., an upper portion and a lower portion. More specifically, the instrument panel 14 includes an upper instrument panel 14B and a lower instrument panel 14C. The upper instrument panel 14B is positioned above the column upper cover 20. A projecting portion 14A is formed in the upper end portion of the upper instrument panel 14B. The lower instrument panel 14C is positioned below the column lower cover 22.

[General structure of the steering column 12] Hereinafter, only elements of the steering column 12, which are related to the knee airbag device 10 according to the embodiment, will be described. The steering column 12 includes a cylindrical column tube 26. A steering main shaft 28 is rotatably supported at the core of the column tube 26. The steering main shaft 28 is divided into two portions in the direction of the axis of the steering column 12. That is, the steering main shaft 28 includes an upper shaft 28A and a lower shaft (not shown). The upper shaft 28A is spline-fitted to the lower shaft. Accordingly, the upper shaft 28A is movable with respect to the lower shaft in a predetermined stroke. However, the upper shaft 28A is not rotatable with respect to the lower shaft. A steering wheel 34 is fixed at the rear end portion of the upper shaft 28A using a nut. A driver applies steering force to the steering wheel 34.

The column tube 26, which covers the steering main shaft 28, is also divided into two portions in the direction of the axis of the steering column 12, i.e., the column tube 26 has a double-tube structure. That is, the column tube 26 includes an inner tube 36 disposed close to an occupant, and an outer tube 38 disposed opposite to the occupant (i.e., disposed close to a steering gear box). The inner tube 36 is spline-fitted to the outer tube 38. The diameter of the outer tube 38 is larger than the diameter of the inner tube 36. When a secondary collision occurs between the occupant and the steering wheel 34, the inner tube 36 slides into the outer tube 38 so that the column tube 26 is contracted. Thus, energy is absorbed at the time of secondary collision. Further, the outer tube 38 is supported by a steering support fixed to an instrument panel reinforce (not shown) with a pipe shape, via a housing 40 with a rectangular frame shape and a lower bracket (not shown). The instrument panel reinforce has high strength and high rigidity, and extends along the vehicle-width direction in the instrument panel 14. The steering column 12 shown in FIG. 1 is an electric steering column, such as a tilt/telescopic steering column. However, the steering column 12 may be a mechanical steering column.

Further, a combination switch 66 is disposed on the rear end portion of the inner tube 36 of the steering column 12. Further, a steering lock 68 is disposed on the inner tube 36 at a position ahead of the combination switch 66 in the direction of the axis of the steering column 12. The steering lock 68 includes a clamp portion 68A and a lock body portion 68B. The clamp portion 68A is fastened to the outer peripheral portion of the inner tube 36 using a bolt. The clamp portion 68A has a ring shape, and is divided into two portions. The lock body portion 68B projects from the clamp portion 68A toward an area on the side of the steering column 12. The lock body portion 68B is electrically operated. However, the lock body portion 68B may be mechanically operated. In this construction, the diameter of a movable tube disposed close to the occupant is smaller than the diameter of a fixed tube disposed close to the steering gear box.

[Configuration of the knee airbag device 10] Next, the configuration of the knee airbag device 10 according to the embodiment will be described.

The knee airbag device 10 includes an airbag module 54 and an airbag door 60. The airbag module 54 includes a module case 48, an inflator 50, and a knee airbag 52. The module case 48, which has a substantially box shape, is made of metal. The lower portion of the module case 48 is open. The inflator 50, which has a substantially cylindrical shape, is housed in the module case 48 at a rear end portion. The inflator 50 may be regarded as the gas generation device. The knee airbag 52 is stored in the folded state inside the module case 48 at a front end portion. The airbag door 60 covers the opening of the module case 48.

A plurality of hook portions 56 are formed at predetermined intervals in each of the front wall portion 48A and the rear wall portion 48B of the module case 48 (refer to FIG. 2). In this regard, a front wall portion 22A and a rear wall portion 22B stand toward the inner tube 36 on the inner surface of the column lower cover 22 (i.e., the surface that faces the inner tube 36) at a predetermined interval in the direction of the axis of the steering column 12. Engagement holes 58 are formed in each of the front wall portion 22A and the rear wall portion 22B. The hook portions 56 are engaged with the respective engagement holes 58. As a result, the airbag module 54 is located between the front wall portion 22A and the rear wall portion 22B of the column lower cover 22.

In FIG. 1, the knee airbag 52, which has been spread flat, is accordion-folded. However, the knee airbag 52 need not necessarily be accordion-folded. The knee airbag 52 may be rolled up. Alternatively, a portion of the knee airbag 52 may be accordion-folded, and another portion of the knee airbag 52 may be rolled up (the method in which a portion of the knee airbag 52 is accordion-folded and another portion of the knee airbag 52 is rolled up will be described later). Further, the shape of the deployed knee airbag 52 will be supplementarily described. As shown in FIG. 2, a center portion 52A that is inflated below the steering column 12 is relatively thin, because there is the column lower cover 22 below the steering column 12. Right and left portions 52B that are inflated on the sides of the steering column 12 are relatively thick because the right and left portions 52B are inflated between the instrument panel 14 and the knees of the occupant.

The above-described airbag module 54 is disposed below the rear end portion of the inner tube 36 of the column tube 26. More specifically, the intermediate portion (semi-circular portion) of an attachment bracket 70, which has a substantially M-shape in a view taken along a plane perpendicular to the axis of the steering column 12, is fixed to the inner tube 36 at a position between the combination switch 66 and the steering lock 68 by welding. A stud bolt 72, which stands from the inflator 50, is inserted in the lower end portion of each of a pair of right and left leg portions 70A of the attachment bracket 70. A nut 74 is fitted to the stud bolt 72 from above the steering column 12, and thus, the airbag module 54 is fixed to the rear end portion of the inner tube 36.

In the embodiment, an opening 76, through which the knee airbag 52 is expanded, is formed in the bottom wall portion 22C between the front wall portion 22A and the rear wall portion 22B of the column lower cover 22. The front wall portion 22A and the rear wall portion 22B stand on the inner surface of the column lower cover 22 in a manner such that the opening 78 is positioned between the front wall portion 22A and the rear wall portion 22B. The airbag door 60 is fitted to the opening 76, as described above. That is, the airbag door 60 is formed separately from the column lower cover 22. As shown in FIG. 3, the airbag door 60 is formed to have a substantially rectangular flat plate shape in a plan view. The peripheral edge portion of the airbag door 60 is formed to have a stepped shape so that the peripheral edge portion of the airbag door 60 is engaged with a stepped portion formed in the peripheral edge portion around the opening 76 of the column lower cover 22. A plurality of engagement portions 78, which are elastically deformable, stand in the front side of the peripheral edge portion of the airbag door 60, which has the stepped shape. Recessed engaged portions 80 (refer to FIG. 2) that are engaged with the engagement portions 78 are formed near the lowest portion of the surface of the front wall portion 22A of the column lower cover 22. The surface faces the engagement portions 78. Instead of forming the engagement portions 78 only in the front side of the peripheral edge portion of the airbag door 60 and forming the engaged portions 80 only in the front side of the peripheral edge portion around the opening 76, the engagement portions 78 may be provided in two sides, i.e., in the front and the rear sides of the peripheral edge portion of the airbag door 60, and the engaged portions 80 may be provided in two sides, i.e., in the front wall portion 22A and the rear wall portion 22B. Alternatively, the engagement portions 78 may be provided in four sides, i.e., in the front and rear sides and the right and left sides of the peripheral edge portion of the airbag door 60, and the engaged portions 80 may be provided in four sides, i.e., in the front wall portion 22A and the rear wall portion 22B, and the right and left sides of the peripheral edge portion around the opening 76.

As shown in FIG. 3, the airbag door 60 and the airbag module 54 are connected to each other by a pair of right and left elongated straps 82. A bolt insertion hole 84 is formed in one end portion 82A of each strap 82. The stud bolt 72 is inserted into the bolt insertion hole 84. Accordingly, the one end portions 82A of the straps 82 and the airbag module 54 are fastened to the pair of the leg portions 70A (refer to FIG. 1 and FIG. 2). Each strap 82 extends on the upper surface of the bottom wall portion 48C, the front wall portion 48A, and the opening portion of the module case 48. The other end portion 82B of the strap 82 is embedded into, and fixed to the rear end portion of the airbag door 60, for example, by insert molding. In FIG. 3, an extra length portion 86 in the intermediate portion of each strap 82 is shown by the two-dot chain line. The extra length portion 86 will be described in the second embodiment.

[Advantageous effects obtained in the embodiment] Next, a method of fitting the steering column 12 provided with the knee airbag device 10 according to the embodiment to a vehicle will be described. In the description of the method, the advantageous effects obtained in the embodiment will be described.

First, in a first process, a steering column body that includes the steering main shaft 28 and the column tube 26 is assembled. Next, in a second process, the airbag module 54, which is integrally provided on the airbag door 60 formed separately from the column lower cover 22, is fitted to the inner tube 36 of the column tube 26 via the attachment bracket 70. This operation is performed after the steering column body is assembled, and before the steering lock 68 is fitted to the inner tube 36 of the column tube 26. Accordingly, nothing interferes with the operation of fitting the airbag module 54 to the inner tube 36 of the column tube 26. Thus, the operation of fitting the airbag module 54 to the inner tube 36 is performed extremely easily.

Next, in a third process, the steering lock 68 and the combination switch 66 are fitted to the inner tube 36 of the column tube 26, and thus, a steering column sub-assembly is formed. The operations so far (i.e., the first to third processes) are performed in a steering column sub-line. Then, the steering column sub-assembly is inserted through the opening portion 16 of the instrument panel 14 provided in the vehicle, and fitted to the instrument panel 14. The process of assembling the instrument panel 14 is performed in an instrument panel sub-line that is separate from the steering column sub-line.

Then, in a fourth process, the column lower cover 22 and the column upper cover 20, which cover the rear end portion of the steering column 12, is fitted to the steering column 12.

When the vehicle, in which the knee airbag device 10 is provided in the above-described processes, has a frontal collision (or when it is predicted that the vehicle will have a frontal collision), a collision detection device (not shown) determines that the vehicle has a frontal collision (or predicts that the vehicle will have a frontal collision), and outputs a signal to an airbag ECU. When the airbag ECU determines that airbag devices should be operated, a driver seat airbag device is operated to inflate a driver seat airbag 88 on the steering wheel 34, and the knee airbag device 10 is operated, as shown in FIG. 2. That is, a predetermined current is supplied to the inflator 50 of the knee airbag device 10, and thus, the inflator 50 is operated. As a result, the inflator 50 generates gas, and the gas is supplied to the knee airbag 52 stored in the folded state, and thus the knee airbag 52 is inflated. When the inflation pressure of the knee airbag 52, which is applied to the column lower cover 22, reaches a predetermined value, the pair of engagement portions 78 formed in the front side of the peripheral edge portion of the airbag door 60 are disengaged from the engaged portions 80 formed in the front wall portion 22A of the column lower cover 22, and thus, the airbag door 60 is opened toward the lower instrument panel 14C. Because the airbag door 60 and the airbag module 54 are connected to each other by the straps 82, the airbag door 60 does not drop off. As a result, the knee airbag 52 is inflated and deployed toward the area below the steering column 12 and the areas on the sides of the steering column 12. Thus, the right and left side portions 52B, which are disposed between the instrument panel 14 and the knees of the occupant, receive and protect the knees of the occupant.

In the knee airbag device 10 according to the embodiment, the opening 76, through which the knee airbag 52 is expanded, is formed in the column lower cover 22. The airbag door 60 is formed separately from the column lower cover 22. The airbag module 54, which includes the inflator 50 and the knee airbag 52, is integrally provided on the surface of the airbag door 60, which faces the steering column 12. Therefore, in the stage before the airbag module 54 is fitted to steering column 12, the column lower cover 22 is separate from, and independent of the airbag door 60 on which the airbag module 54 is integrally provided. Therefore, in the initial stage of the process of assembling the steering column 12 (the column sub-line process), the airbag module 54 can be fitted to the steering column 12.

That is, because the airbag module 54 is disposed below the steering column 12, when the airbag module 54 is fitted to the column tube 26, the nuts 74 are fitted to the stud bolts 72 in a fitting direction from above the steering column 12 to below the steering column 12 (i.e., the direction shown by the arrow P in FIG. 1). If other components (for example, the steering lock 68) have been already fitted to the column tube 26 of the steering column 12, that is, there are the other components in this fitting direction, it is extremely difficult to perform the operation of fitting the airbag module 54 to the column tube 26, because the projecting portion 14A of the upper instrument panel 14B interferes with the operation of fitting the airbag module 54 to the column tube 26. However, in the embodiment, the airbag module 54 is fitted to the column tube 26 before the other components, which may interfere with the operation of fitting the airbag module 54 to the column tube 26, are fitted to the column tube 26. Thus, the operation of fitting the airbag module 54 to the column tube 26 is performed extremely easily. That is, in the embodiment, it is possible to easily fit the steering column 12 to the column tube 26.

Also, in the method of fitting the steering column provided with the knee airbag device to a vehicle, as described above, it is not necessary to follow the procedure in which the airbag module 54 is fitted to the column tube 26 after the steering column 12 is fitted to the instrument panel 14 provided in the vehicle. Thus, the airbag module 54 can be fitted to the inner tube 36 of the column tube 26 in the line process of the steering column sub-line (more specifically, before the steering lock 68 is fitted to the column tube 26). Accordingly, as described above, nothing interferes with the operation of fitting the airbag module 54 to the inner tube 36 of the column tube 26. Thus, by employing the above-described structure, and the above-described fitting method, it is possible to perform the operation of fitting the airbag module 54 to column tube 26 extremely easily. This greatly improves the operating efficiency, and accordingly, the efficiency of producing the vehicle.

Second Embodiment

Hereinafter, a second embodiment of the invention will be described with reference to FIG. 4 to FIG. 6. The same and corresponding portions as those of the configuration in the first embodiment are denoted by the same reference numerals, and the description thereof will be omitted.

Figure 4:
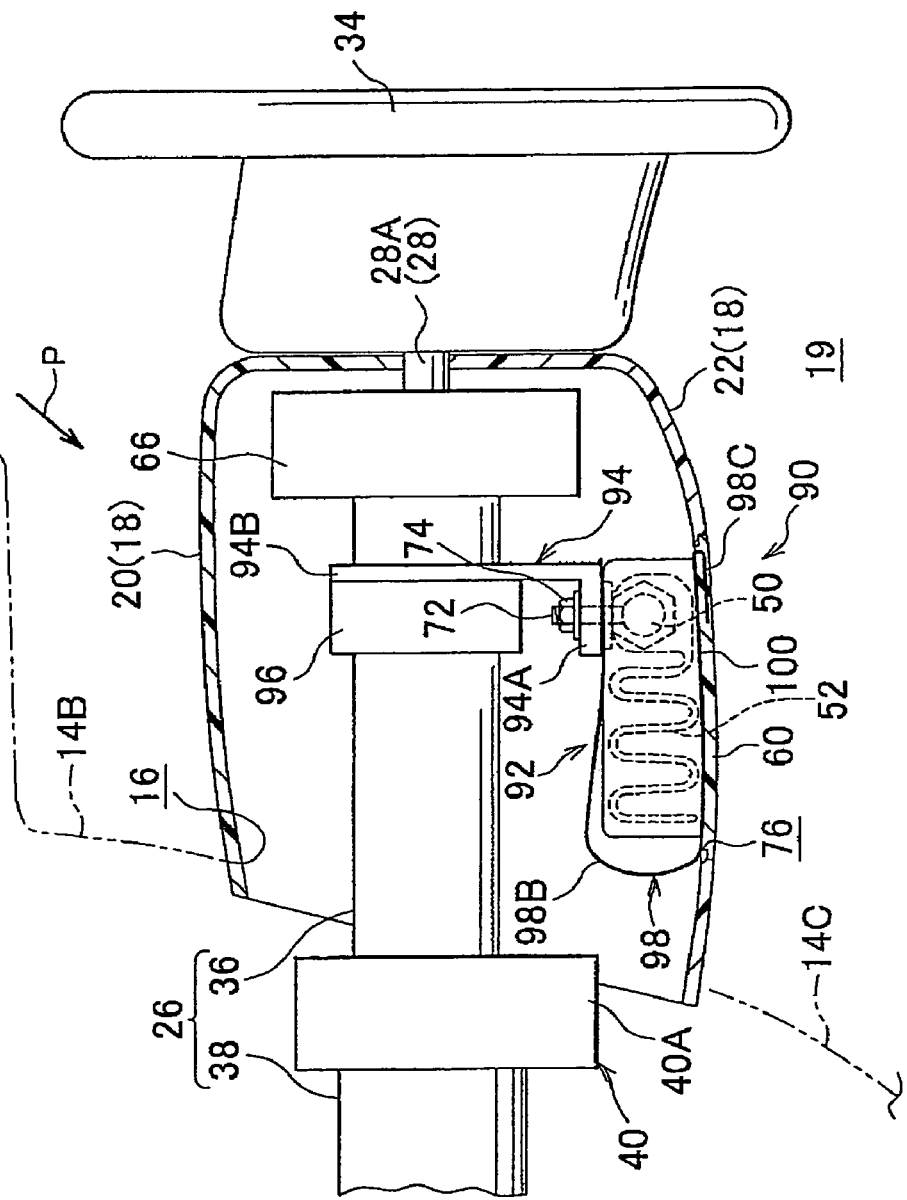
FIG. 4 is a longitudinal sectional view showing the enlarged entire configuration of a knee airbag device according to a second embodiment.
Figure 5:
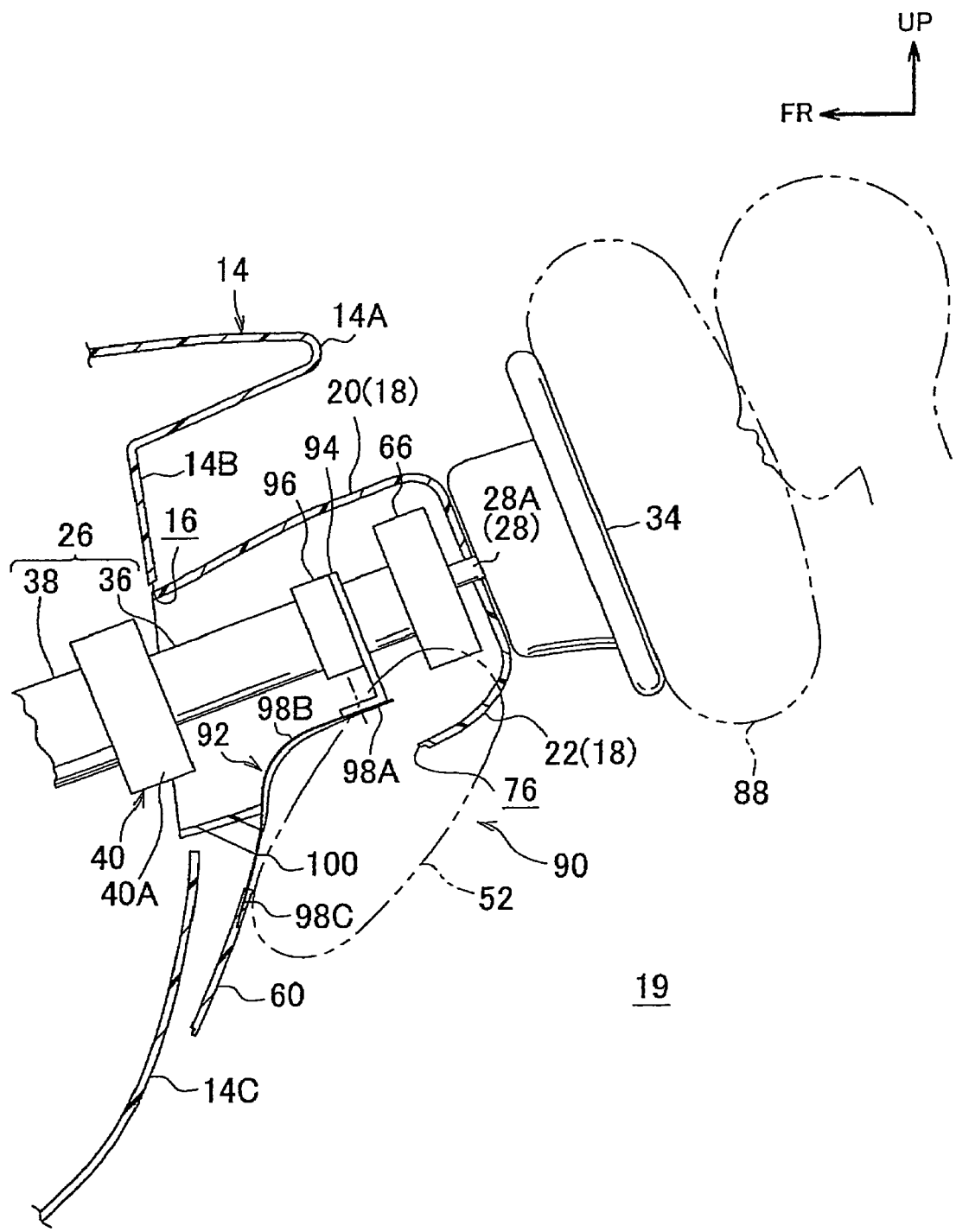
FIG. 5 is a longitudinal sectional view showing the entire configuration of the knee airbag device according to the second embodiment in a lateral view, FIG. 5 corresponding to FIG. 1.
Figure 6:
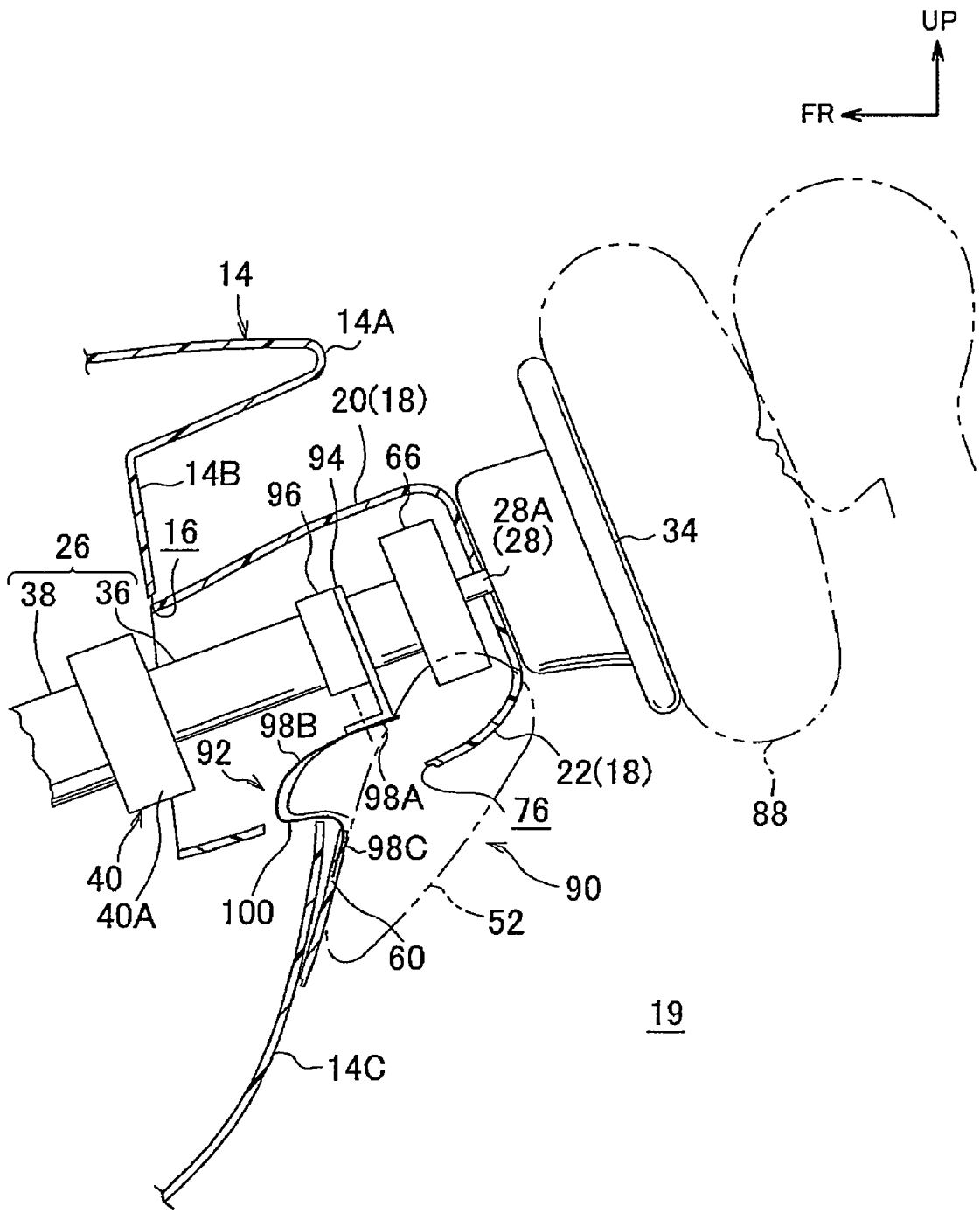
FIG. 6 is a longitudinal sectional view showing the knee airbag device shown in FIG. 5 that is operated, FIG. 6 corresponding to FIG. 2.

As shown in FIG. 4 and FIG. 5, in a knee airbag device 90 according to a second embodiment, an airbag module 92 is fixed to the inner tube 36 of the steering column 12 using an attachment bracket 94 that has an L-shape in a lateral view. The attachment bracket 94 includes an attachment portion 94A and a vertical wall portion 94B. The inflator 50 is fixed to the attachment portion 94A. The vertical wall portion 94B extends toward a position above the steering column 12 from the edge of the attachment portion 94A, which is located under the rear portion of the steering column 12. In the vertical wall portion 94B of the attachment bracket 94, a through-hole (not shown), through which the inner tube 36 is inserted, is formed. The electric steering lock 96 is fitted to the inner tube 36 at a position adjacent to the vertical wall portion 94B of the attachment bracket 94 (i.e., at the position ahead of the vertical wall portion 94B). When the steering lock 96 is fitted to the inner tube 36, the stud bolts 72 and the nuts 74 are disposed directly under the steering lock 96.

The airbag module 92 is integrally provided on the upper surface of the airbag door 60 formed separately from the column lower cover 22. The airbag door and the airbag module 92 are connected to each other by a connection member 98 made of a mesh material. The connection member 98 is made of a flexible material. One end portion 98A of the connection member 98 and the airbag module 92 are fastened to the attachment portion 94A of the attachment bracket 94. The intermediate portion 98B of the connection member 98 covers the upper surface, the front end surface, and the lower surface of the airbag module 92. Further, the other end portion 98C of the connection member 98 is embedded into the airbag door 60. Further, in the intermediate portion 98B of the connection member 98, a portion located on the lower surface of the airbag module 92 is an extra length portion 100. The extra length portion may be provided in the intermediate portion 98B of the connection member 98 at any position.

[Advantageous effects] In the above-described configuration, when the vehicle has a frontal collision, the knee airbag device 90 is operated, and the knee airbag 52 is inflated and deployed toward the area below the column lower cover 22. At this time, the intermediate portion 98B of the connection member 98 functions as a hinge when the airbag door 60 is opened. Thus, the airbag door 60 is maintained at a position away from the opening 76 of the column lower cover 22. That is, when the airbag door 60 is opened toward the lower instrument panel 14C, the airbag door 60 is supported by the connection member 98. When the airbag door 60 is opened, the intermediate portion 98B of the connection member 98 maintains the airbag door 60 at a position away from the opening 76.

When a secondary collision occurs between the occupant and the steering wheel 34 via the driver seat airbag 88, a secondary collision load is input to the column tube 26 of the steering column 12. When the input load is equal to or above a predetermined value, the steering main shaft 28 and the column tube 26 are contracted toward the front side in the axial direction of the steering column 12 (the upper shaft 28A is relatively moved into the lower shaft in the axial direction, and the inner tube 36 is relatively moved toward the outer tube 38) as shown in FIG. 6. The energy input to the column tube 26 from the steering wheel 34 at the time of secondary collision is absorbed by the friction resistance generated in the process.

As described above, when the steering main shaft 28 and the column tube 26 are contracted toward the front side in the axial direction of the steering column 12, the attachment bracket 94, which serves as a fixation point at which the connection member 98 is fixed to the column tube 26, is moved toward the front side in the axial direction of the steering column 12. Therefore, the intermediate portion 98B of the connection member 98 that connects the airbag module 92 and the airbag door 60 is pulled (drawn) into the column lower cover 22. However, in the embodiment, because the extra length portion 100 is provided in the intermediate portion 98B of the connection member 98, the extra length portion 100 is pulled into the column lower cover 22. Accordingly, the airbag door 60 itself is not pulled into the column lower cover 22 from the opening 76.

When the electric steering column 12 is employed, and the housing 40 is disposed on the outer tube 38 to protrude downward as in the embodiment, the lower portion 40A of the housing 40 may interfere with the intermediate portion 98B of the connection member 98. However, in the embodiment, because the airbag module 92 and the airbag door 60 are connected to each other by the flexible connection member 98, if the lower portion 40A of the housing 40 interferes with the intermediate portion 98B of the connection member 98, the intermediate portion 98B of the connection member 98 can be flexibly deformed. Accordingly, the intermediate portion 98B of the connection member 98 does not interfere with the contraction movement of the steering column 12, and the steering column 12 is reliably contracted in a predetermined stroke.

As a result, in the embodiment, when a secondary collision occurs between the occupant and the steering wheel 34, the column tube 26 of the steering column 12 is smoothly contracted. Thus, the steering column 12 effectively absorbs the energy.

In the embodiment, the flexible connection member 98 is used as the connection member. Also, in the intermediate portion 98B of the connection member 98, a portion located on the lower surface of the airbag module 92 is the extra length portion 100. However, the invention is not limited to this configuration. As in the strap 82 described in the first embodiment (refer to FIG. 3), the extra length portion 86 (refer to the two-dot chain line) may be provided in the intermediate portion.

Third Embodiment

Hereinafter, a third embodiment of the invention will be described with reference to FIG. 7 and FIG. 8. The same and corresponding portions as those of the configuration, for example, in the first embodiment are denoted by the same reference numerals, and the description thereof will be omitted.

Figure 7:
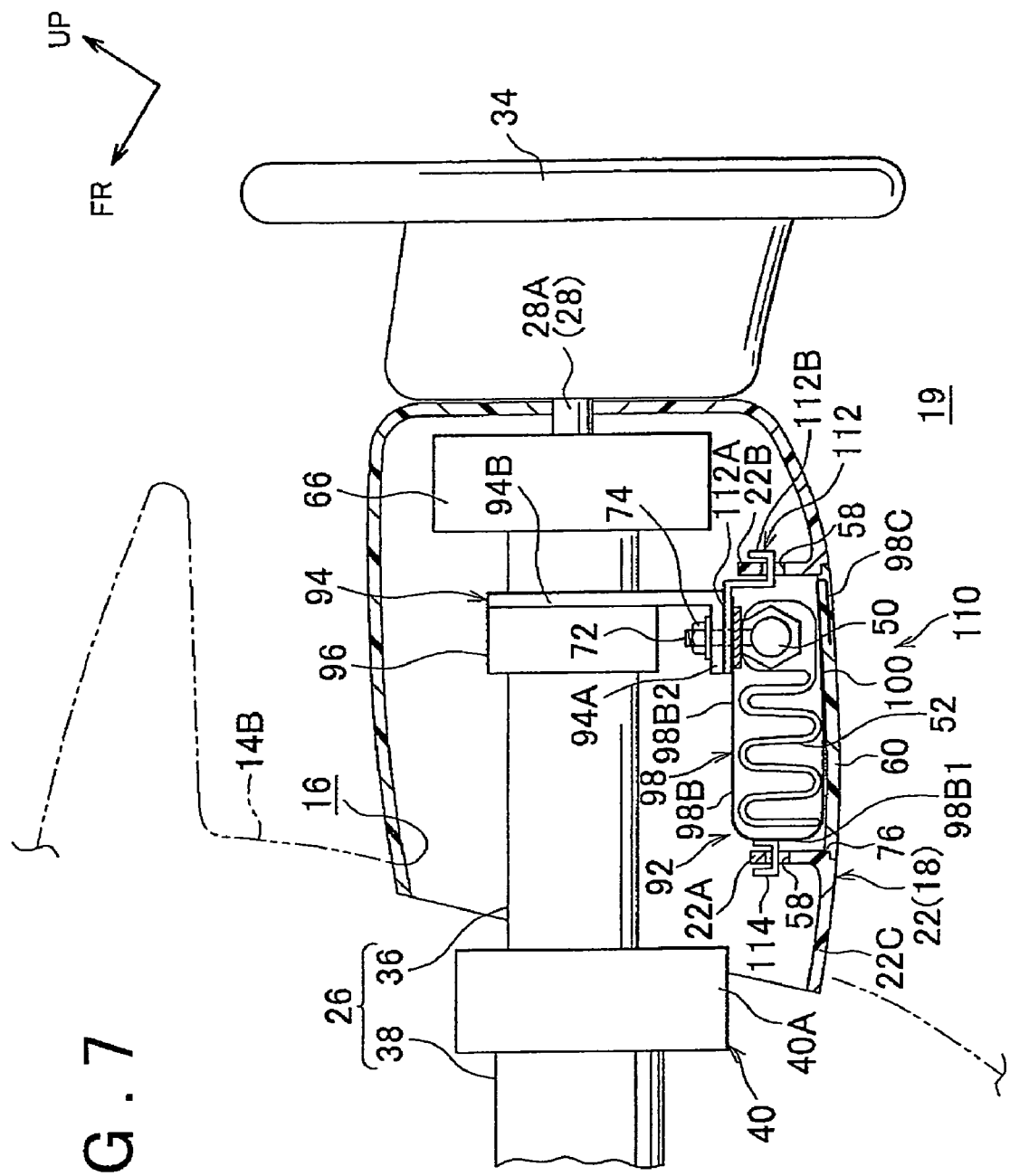
FIG. 7 is a longitudinal sectional view showing the enlarged entire configuration of a knee airbag device according to a third embodiment.
Figure 8:
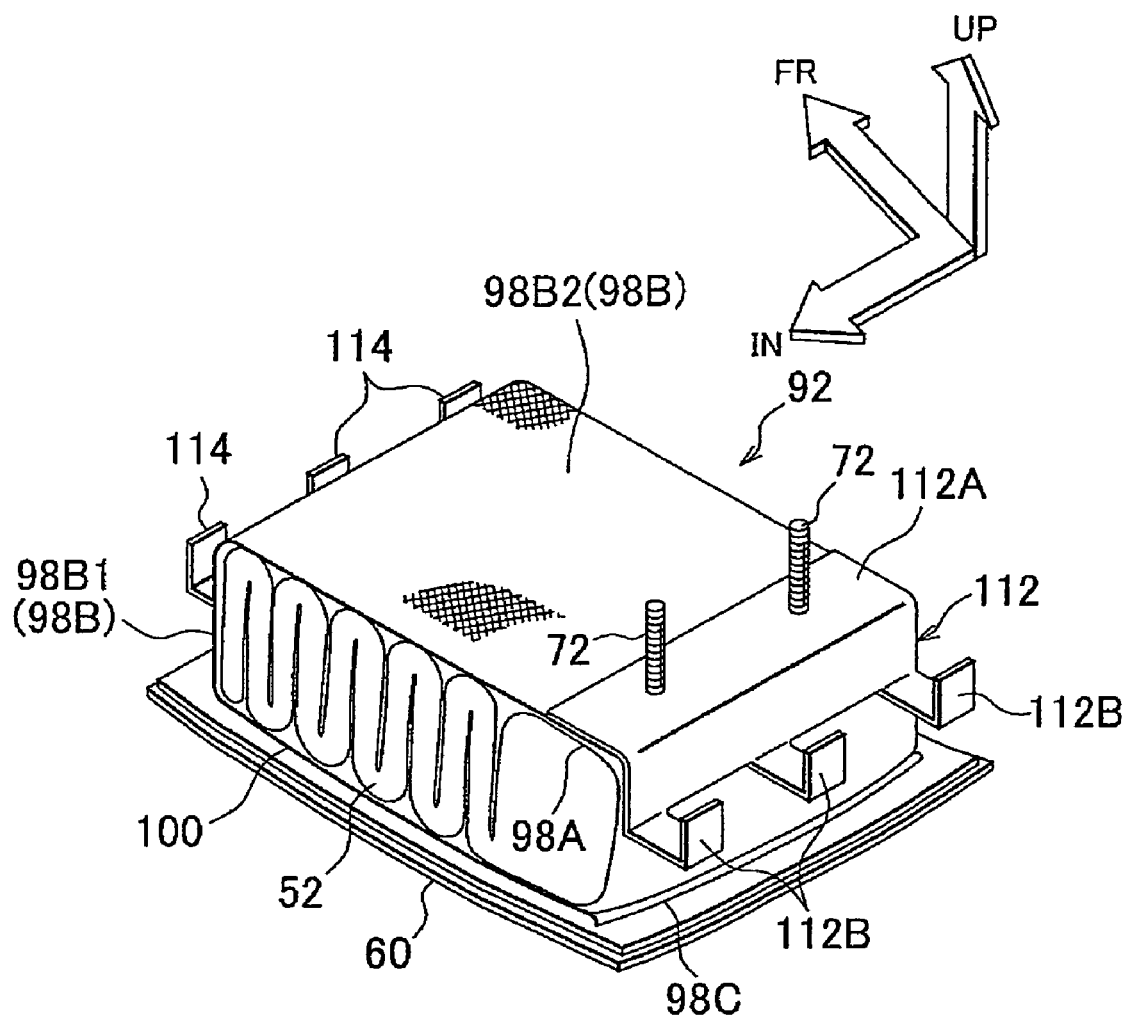
FIG. 8 is an enlarged perspective view showing an airbag door and an airbag module shown in FIG. 7.

As shown in FIG. 7 and FIG. 8, a knee airbag device 110 according to the third embodiment has the basically same configuration as that of the knee airbag device 90 according to the second embodiment. However, the knee airbag device 110 according to the third embodiment differs from the knee airbag device 90 according to the second embodiment, in that the airbag 52 is wrapped in protective cloth, and then covered by the connection member 98 without using the module case, and hooks are fitted to the front and rear portions of the connection member 98.

More specifically, as shown in FIG. 8, a rear hook 112, which has a substantially J-shape cross section (substantially U-shape cross section), is fitted to the one end portion 98A of the connection member 98. The rear hook 112 includes a base portion 112A and hook portions 112B. The base portion 112A has a band shape, and the stud bolts 72, which protrude from the inflator 50, extend through the base portion 112A. Each hook portion 112B extends downward from the base portion 112A, and bends to have a J-shape CU-shape) cross section. Because the stud bolts 72, which protrude from the inflator 50, are fitted to the attachment portion 94A of the attachment bracket 94 using the nuts 74, the base portion 112A of the rear hook 112 and the airbag module 92 are fastened to the attachment portion 94A of the attachment bracket 94.

Front hooks 114 are fitted to the front portion 98B1 of the intermediate portion 98B of the connection member 98. Each front hook 114 has the same configuration as that of the hook portion 56 in the first embodiment shown in FIG. 3.

The front hooks 114 are engaged with the engagement holes 58 formed in the front wall portion 22A of the column lower cover 22. The hook portions 112B of the rear hook 112 are engaged with the engagement holes 58 formed in the rear wall portion 22B. When the front hooks 114 are engaged with the engagement holes 58 of the front wall portion 22A of the column lower cover 22, and the hook portions 112B of the rear hook 112 are engaged with the engagement holes 58 of the rear wall portion 22B of the column lower cover 22, a predetermined tension is applied to the upper surface portion 98B2 of the intermediate portion 98B of the connection member 98.

[Advantageous effects] In the above-described configuration, the front hooks 114 and the rear hook 112 are fitted to the connection member 98. The front hooks 114 are engaged with the engagement holes 58 of the front wall portion 22A of the column lower cover 22, and the hook portions 112B of the rear hook 112 are engaged with the engagement holes 58 of the rear wall portion 22B of the column lower cover 22. Thus, when the knee airbag device 10 is provided in the vehicle, a pressing force toward the opening 76 (i.e., in the direction where the knee airbag 52 is deployed) is applied to the knee airbag 52 in the folded state. Accordingly, when the inflator 50 is operated and the knee airbag 52 is inflated and deployed, it is possible to reduce the possibility that a portion of the knee airbag 52 is inflated toward the column tube 26 to have a round shape. As a result, according to the embodiment, it is possible to regulate the direction where the knee airbag 52 is deployed, to a desired direction (i.e., toward the area below the column lower cover 22).

Fourth Embodiment

Hereinafter, a fourth embodiment of the invention will be described with reference to FIG. 9. The same and corresponding portions as those of the configuration, for example, in the first embodiment are denoted by the same reference numerals, and the description thereof will be omitted.

Figure 9:
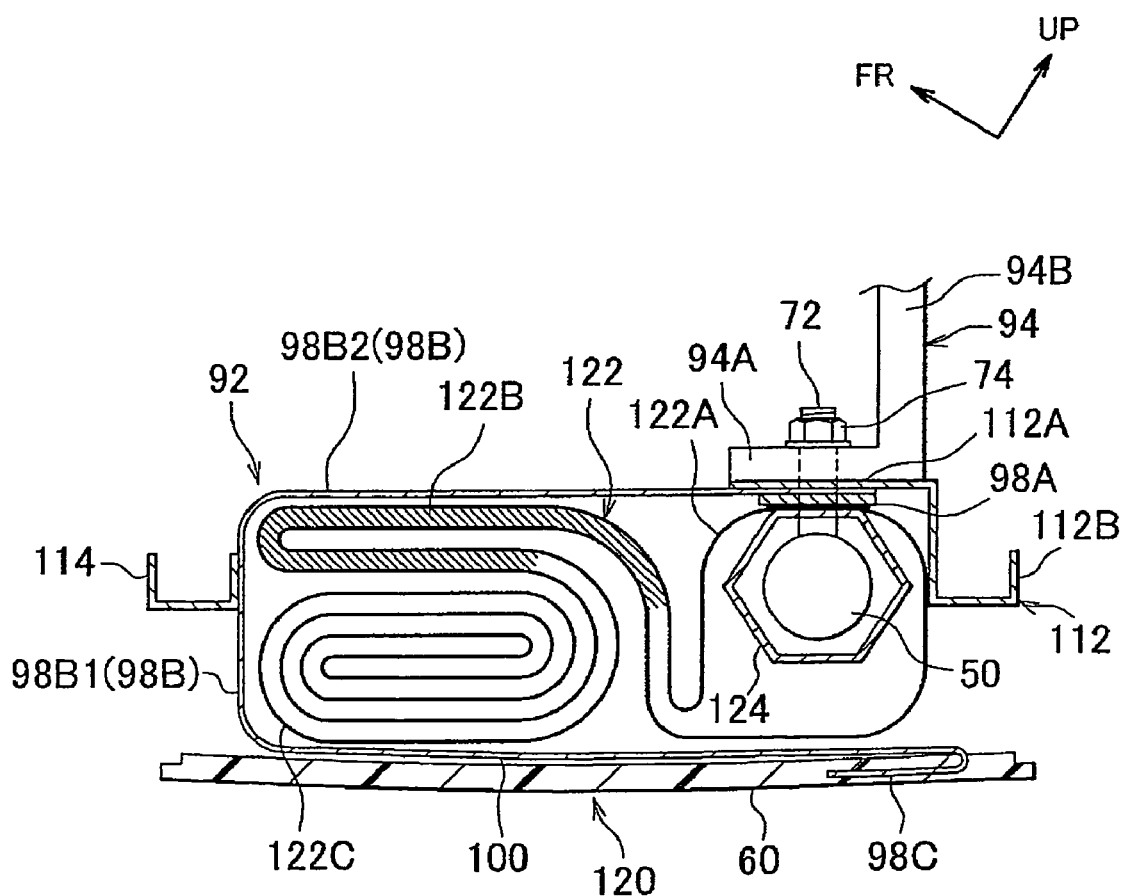
FIG. 9 is an enlarged longitudinal sectional view showing the main portion of a knee airbag device according to a fourth embodiment.

As shown in FIG. 9, a knee airbag device 120 according to a fourth embodiment has the basically same configuration as that of the knee airbag device 110 according to the third embodiment. However, the method of folding a knee airbag 122 in the knee airbag device 120 differs from the method of folding the knee airbag 52 in the knee airbag 110 according to the third embodiment.

More specifically, the knee airbag 122 includes a proximal end portion 122A, an accordion-folded portion 122B, and a rolled-up portion 122C. The proximal end portion 122A encloses a diffuser 124 disposed around the inflator 50. The accordion-folded portion 122B is communicated with the proximal end portion 122A, and disposed to face the column tube 26. The rolled-up portion 122C is communicated with the accordion-folded portion 122B, and is disposed to face the airbag door 60.

[Advantageous effects] In the above-described configuration, the knee airbag 122, which has been spread flat, is folded in a manner such that a portion of the knee airbag 122 is accordion-folded, and the other portion of the knee airbag 122 is rolled up. The accordion-folded portion 122B is disposed to face the column tube 26, and the rolled-up portion 122C is disposed close to the airbag door 60. Therefore, first, the gas injected from the inflator 50 flows into the accordion-folded portion 122B (the hatched portion), and the accordion-folded portion 122B is inflated. As a result, the rolled-up portion 122C disposed close to the airbag door 60 is pushed in the direction in which the airbag door 60 is deployed. Thus, it is possible to increase the airbag inflation pressure that is applied to the airbag door 60 from the initial stage of the inflation of the knee airbag 122. Thus, by employing the above-described folding method, it is possible to regulate the direction where the knee airbag 122 is deployed, to the desired direction (i.e., toward the area below the column lower cover 22), and to deploy the knee airbag 122 more quickly.

[Supplementary description of the above-described embodiments] (1) In each of the above-described embodiments, when the vehicle has a frontal collision, each of the knee airbag devices 10, 90, 110, and 120 is operated. However, the invention is not limited to this configuration. A pre-crash sensor may be provided, for example, at a center portion of a front bumper, and each of the knee airbag devices 10, 90, 110, and 120 may be operated also when it is predicted that the vehicle will have a frontal collision.

(2) In the airbag module 54 in the knee airbag device 10 according to the first embodiment, the module case 48 made of metal is used. However, the invention is not limited to this configuration. That is, the module case 48 made of a flexible material, such as cloth, may be used. Also, in each of the knee airbag device 90 according to the second embodiment, the knee airbag device 110 according to the third embodiment, and the knee airbag device 120 according to the fourth embodiment, the module case is not used, and the inflator 50 and the knee airbag 52 or 122 are wrapped in the protective cloth, and then covered by the connection member 98. However, an airbag case made of cloth may be additionally provided.

What is claimed is:

1. A knee airbag device comprising:
    an opening formed in a column lower cover that covers a rear lower end portion of a steering column;
    an airbag door that is formed separately from the column lower cover, and that covers the opening, wherein when an airbag inflation pressure equal to or above a predetermined value is applied to the airbag door, the airbag door is opened; and
    an airbag module that is integrally provided on a surface of the airbag door, which faces the steering column, wherein the airbag module includes a gas generation device that generates gas when a vehicle collides with a collision object or when it is predicted that the vehicle will collide with the collision object, and a knee airbag that is stored in a folded state, and that is inflated and deployed through the opening when the knee airbag receives the gas from the gas generation device, wherein
    the airbag door and the airbag module are connected to each other by a flexible connection member;
    the connection member and the airbag module are fixed to a column tube of the steering column;
    at least a portion of the connection member functions as a hinge when the airbag door is opened;
    the connection member includes an extra length portion that maintains the airbag door at a position away from the opening when the airbag door is opened,
    a pair of attachment wall portions stand on a surface of the column lower cover, which faces the steering column, in a manner such that the opening is positioned between the attachment wall portions; and
    an upper surface of the airbag module is covered by the connection member and the connection member is fixed to the attachment wall portions so that a predetermined tension is applied to the connection member.

2. The knee airbag device according to claim 1, wherein:
    one end portion of the connection member and the airbag module are fastened to the column tube at a position on an upper portion of the airbag module;
    an intermediate portion of the connection member covers at least a portion of an upper surface, at least a portion of a front surface, and at least a portion of a lower surface of the airbag module;
    the other end portion of the connection member is fixed to a rear end portion of the airbag door; and
    the extra length portion is provided in the intermediate portion.

3. The knee airbag device according to claim 1, wherein:
    one end portion of the connection member and the airbag module are fastened to the column tube at a position on an upper portion of the airbag module;
    the connection member covers at least a portion of an upper surface, at least a portion of a front surface, and at least a portion of a lower surface of the airbag module;
    the other end portion of the connection member is fixed to a rear end portion of the airbag door; and
    a portion of the connection member, which covers at least the portion of the lower surface of the airbag module, is the extra length portion.

4. The knee airbag device according to claim 1, wherein:
    the steering column includes a mechanism that contracts the steering column by a predetermined distance in an axial direction of the steering column, to absorb an impact when the vehicle has a frontal collision; and
    the length of the extra length portion is longer than the predetermined distance by which the steering column is contracted.

5. The knee airbag device according to claim 1, wherein a pressing force toward the opening is applied to the knee airbag, by covering the upper surface of the airbag module by the connection member and fixing the connection member to the attachment wall portions so that the predetermined tension is applied to the connection member.

6. The knee airbag device according to claim 1, wherein:
    an engagement portion, which is elastically deformable, stand in a peripheral portion of the airbag door; and
    the engagement portion is engaged with an engaged portion that is formed in the attachment wall portion.

7. The knee airbag device according to claim 1, wherein:
    the airbag door and the airbag module are connected to each other by a flexible connection member;

when the airbag door is opened toward a lower portion of an instrument panel, the airbag door is supported by the connection member; and the connection member includes an extra length portion that maintains the airbag door at a position away from the opening when the airbag door is opened.

8. The knee airbag device according to claim 1, wherein:

a portion of the knee airbag is rolled up, and another portion of the knee airbag is accordion-folded; and the portion that is accordion-folded is disposed to face the steering column, and the portion that is rolled up is disposed close to the airbag door.

9. A method of fitting a steering column provided with a knee airbag device to a vehicle, comprising:

assembling a steering column body that includes a steering shaft in which a steering wheel is fixed at a rear end portion, and a column tube that covers the steering shaft in a manner such that the steering shaft is rotated;

fitting an airbag module, which is integrally provided on an airbag door formed separately from a column lower cover, to the column tube after the steering column body is assembled, and before a steering lock is fitted to the column tube;

fitting a steering column sub-assembly, which is formed by fitting at least the steering lock to the column tube, to an instrument panel provided in a vehicle at a predetermined position after the airbag module is fitted to the column tube; and fitting the column lower cover and a column upper cover, which cover a rear end portion of the steering column, to the steering column after the steering column sub-assembly is fitted to the instrument panel.

* * * * *